(12) United States Patent
Wrenn

(10) Patent No.: US 6,766,730 B2
(45) Date of Patent: Jul. 27, 2004

(54) BASTING APPARATUS

(76) Inventor: Judith H Wrenn, 200 Libby LN, Ballentine, SC (US) 29002

( * ) Notice: Subject to any disclaimer, the term of this patent is extended or adjusted under 35 U.S.C. 154(b) by 325 days.

(21) Appl. No.: 09/909,436

(22) Filed: Jul. 19, 2001

(65) Prior Publication Data

US 2003/0015100 A1 Jan. 23, 2003

(51) Int. Cl.[7] .......................... A47J 37/10; A47J 27/00; A47F 5/14
(52) U.S. Cl. ............................ 99/345; 99/446; 99/449; 99/421 H; 211/181.1; 211/175
(58) Field of Search ......................... 99/446, 444, 449, 99/400, 425, 345, 421 H; 211/181.1, 175, 172; 248/166, 172, 94

(56) References Cited

U.S. PATENT DOCUMENTS

| | | | | |
|---|---|---|---|---|
| 532,729 | A | * | 1/1895 | Glassmeyer ................. 99/345 |
| 881,088 | A | * | 3/1908 | McCaughey ................. 74/486 |
| 2,006,385 | A | * | 7/1935 | Dikeman ..................... 99/446 |
| 2,085,189 | A | * | 6/1937 | Prood ....................... 99/421 H |
| 2,847,932 | A | * | 8/1958 | More ....................... 99/421 H |
| 3,199,438 | A | * | 8/1965 | Myler et al. ............... 99/421 R |
| 3,962,961 | A | | 6/1976 | Peters |
| 4,063,496 | A | | 12/1977 | Kozikowski |
| 4,066,010 | A | | 1/1978 | Larsson |
| 4,178,844 | A | * | 12/1979 | Ward et al. .................. 99/449 |
| D308,317 | S | | 6/1990 | Koziol |
| 4,979,437 | A | | 12/1990 | Giebel |
| 5,213,027 | A | | 5/1993 | Tsotsos et al. |
| 5,518,127 | A | | 5/1996 | Warmack et al. |
| 5,536,518 | A | | 7/1996 | Rummel |
| 5,727,449 | A | | 3/1998 | Healy et al. |
| 5,819,639 | A | | 10/1998 | Spell |
| 5,913,965 | A | | 6/1999 | Gargano |

* cited by examiner

Primary Examiner—Reginald L. Alexander
(74) Attorney, Agent, or Firm—Michael A. Mann; Nexsen Pruet Adams Kleemeier, LLC

(57) ABSTRACT

An apparatus used in the basting of foods, including a rack supporting a basting pan, a grill, and a rotisserie having a rotating spit. The rack is dimensioned to fit between the surface of the grill and the rotisserie and includes a grid and a frame. The basting pan is supported by the rack at an elevation so that when the pan is filled with basting fluid, the surface of the basting fluid comes in contact with the food on the rotisserie. The rack is adjustable to accommodate various sized pans and grills. A heating element is also provided that is located in the rear of the grill in relation to the rotisserie.

13 Claims, 3 Drawing Sheets

BASTING APPARATUS

FIELD OF THE INVENTION

The present invention relates to a cooking apparatus, and more particularly, to an apparatus for basting food on a rotisserie in a continuous manner.

BACKGROUND OF THE INVENTION

Rotisserie cooking using spits or skewers has become an increasingly popular means to cook food, particularly meat products. An advantage to rotisserie cooking is that the fat drips off of the food being cooked. In most methods of cooking, the food remains in the same container as its drippings while being prepared. In addition to being a healthy method of preparing food, rotisserie cooking results in evenly cooked food.

Presently, there exist a number of rotisserie cooking devices. These devices commonly include a grill powered by gas or heat-radiating elements, a spit, and means for rotating such as a motor. One problem encountered in these devices is the location of the heating element in relation to the food being cooked. In some rotisserie arrangements, the spit of the rotisserie is located directly above the heating element. Consequently, the drippings from such arrangement fall onto the heating element causing smoke or flames. To avoid this problem, the heating element can be been relocated to the side with relation to the rotisserie.

An additional problem encountered in rotisserie arrangements is that the food being prepared must be manually basted to avoid the food from becoming dry and bland. Although most of the arrangements provide basting pans in close proximity to the food, these arrangements all rely on the evaporation of the basting fluid onto the food and on the occasional manual basting to provide moisture and flavor to the food. Both of these methods of basting, evaporation and manual basting, require a large quantity of basting fluid to effectively flavor and moisturize the food. Furthermore, in order to optimize the tenderness and flavor of the food, one must exert substantial time and energy to ensure the food remains moist.

There is presently a need for a rotisserie apparatus and method of cooking that will most efficiently and conveniently enable the continuous basting of the food being cooked.

SUMMARY OF THE INVENTION

According to its major aspects and briefly described, the present invention is a basting apparatus and method of cooking for obtaining an evenly cooked, juicy, and flavorful food product.

The basting apparatus of the present invention generally includes a rack, a basting pan or container, a grill, and a rotisserie having a spit and means for rotating. The rack is placed on a surface at the base of the grill and is used to elevate the basting pan so that when it is filled with basting fluid the surface of the basting fluid comes in contact with the food on the rotisserie. The rack is adjustable in both width and height for use with various sized grills and pans. The heating element of the grill is located to the side of the rotisserie and basting pan to avoid the dripping of the basting fluid from coming into contact with the heating element.

The method of cooking of the present invention involves a number of steps. First, the food to be cooked must be threaded onto the spit of the rotisserie and is placed above the surface of the grill. Next the rack is placed on the surface of the grill and is adjusted to fit the dimensions of both the grill and the basting pan which it supports. The basting pan is then elevated to a level in which the basting fluid contained therein engages the food on the rotisserie.

The rack is an important feature of the present invention. The rack allows the basting pan to be brought into engagement with the food product on the spit, regardless of the size of the food or its distance from the surface of the grill, so that the food product is continuously basted while rotating on the spit. This feature optimizes the convenience of cooking with a rotisserie.

Another important feature of the present invention is the combination of the rack and the pan. The rack and the pan cooperate so that the rotating food product can be in contact with the surface of the basting juices. The rack allows a variety of pan sizes to be used.

Still another feature of the present invention is the direct contact of the basting juices with the cooking food product. The direct contact results in a greater concentration of the basting juices coming into contact with the food product than is available with the prior art evaporation method.

Yet another feature of the present invention is the location of the heating element of the grill. The heating element is located to the side of the rotisserie, which avoids the basting juices and grease from falling directly onto it potentially causing smoke or flames.

Other features and their advantages will be apparent to those skilled in the art of rotisserie cooking from a careful reading of the Detailed Description of Preferred Embodiment accompanied by the following drawings.

DETAILED DESCRIPTION OF PREFERRED EMBODIMENTS

Figure 1A:
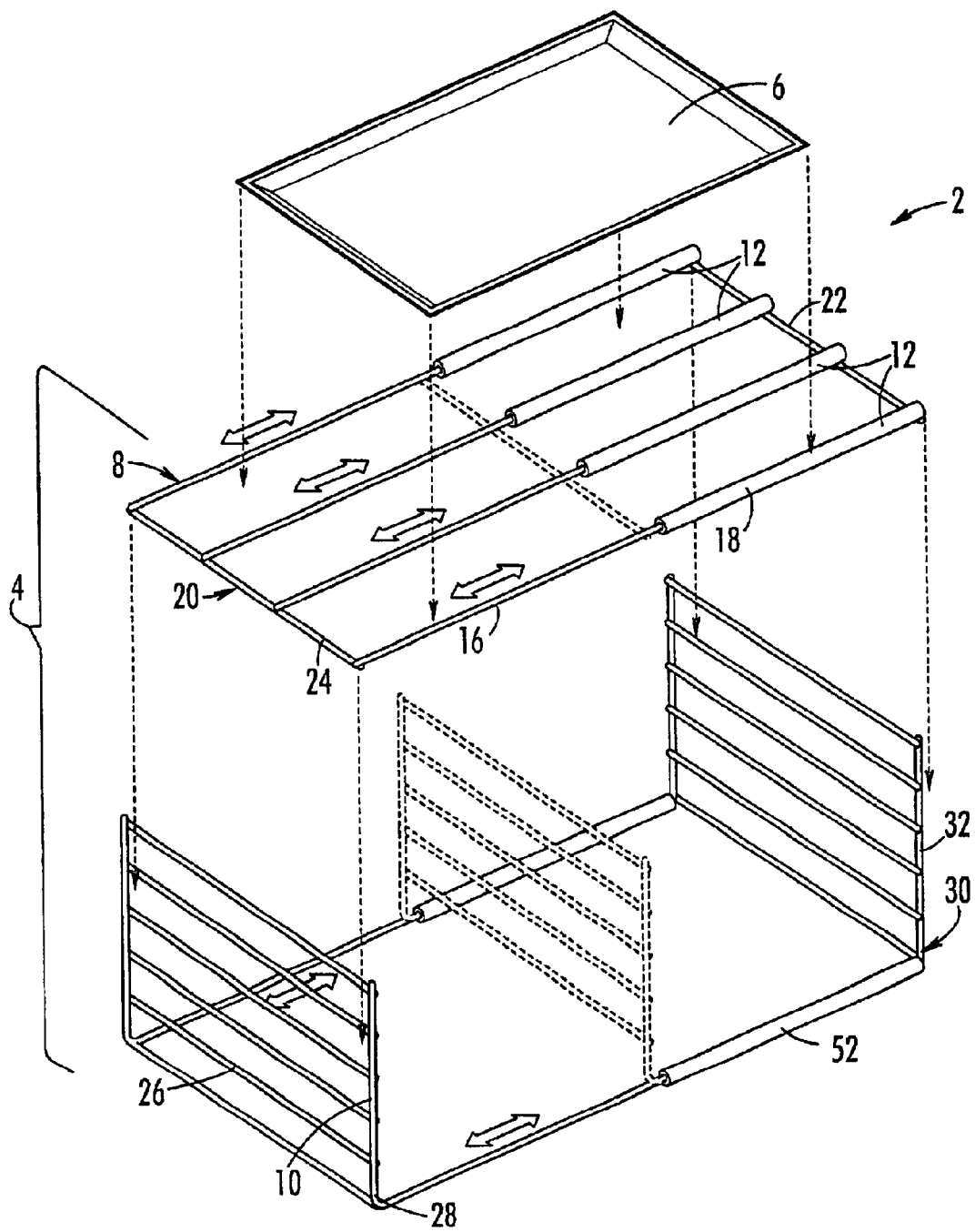
FIG. 1A is a perspective view of the disassembled rack and basting pan of the present invention.
Figure 1B:
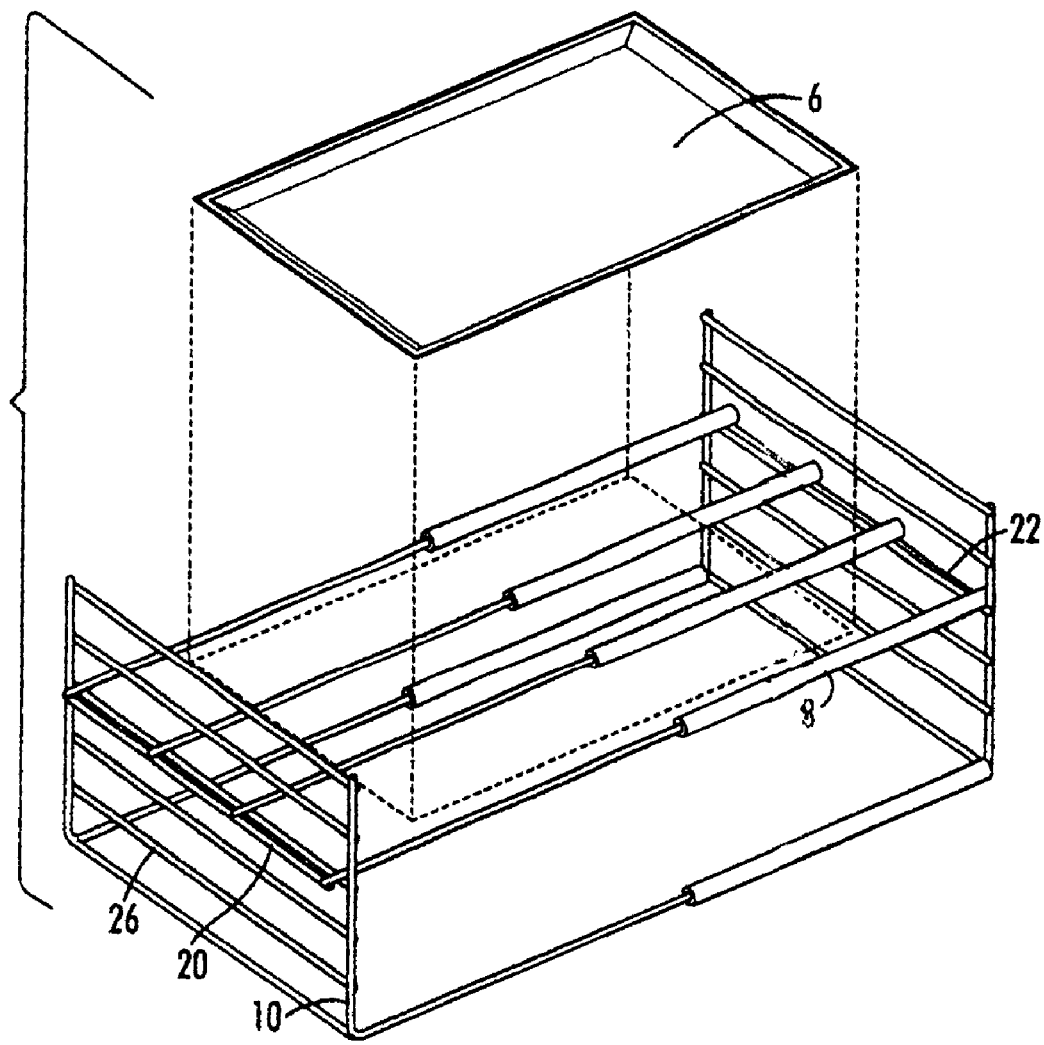
FIG. 1B is a perspective view of the assembled rack and basting pan of the present invention.

Referring now to the drawings, and particularly to FIGS. 1A and 1B, there is shown a basting apparatus 2 including a rack 4 and a pan 6. As shown in FIG. 1A, rack 4 includes a grid 8 and a frame 10. Grid 8 is used to support pan 6 and includes plural bars 12, each bar having an interior member 16 fitting telescopically within an exterior member 18. Therefore, grid 8 is adjustable to provide support for various sized pans. As shown, plural bars 12 are parallel and crossed at opposing edges 20 and 22 by a rigid member 24. Opposing edges 20 and 22 of grid 8 are received by frame 10, which both supports and elevates grid 8. As was noted, it is a particular feature of the present invention to provide basting apparatus 2 including rack 4 for the elevation of basting pan 6 so that when pan 6 is filled with basting liquid, the food being cooked will be continuously engaged with the surface of the basting liquid.

As shown, the elevation of pan 6 by rack 4 is provided by frame 10 that carries a set of rungs 26. Generally resembling a ladder, rungs 26 are parallel and are supported at an angle with respect to interior plural base members 28 and exterior plural base members 30 having a telescopic fit with each other and being affixed and crossed by rungs 26. Each member of exterior plural base members 30 includes a rigid member 32 being affixed to the end of a hollow cylindrical member 52. Therefore, frame 10 is also adjustable to accommodate various sized grills and basting pans.

FIG. 1B generally shows rack 4 as fully assembled. Specifically, FIG. 1B illustrates grid 8 being supported by frame 10 and pan 6 being supported by grid 8. As shown, opposing edges 20 and 22 of grid 8 are received by opposing rungs 26, which are supported at an angle with respect to the base of frame 10. Grid 8 is dimensioned to fit between rungs 26. The elevation of grid 8 that supports pan 6 is adjustable by simply inserting grid 8 into upper or lower rungs 26. As discussed previously, it is a major feature of the present invention to provide basting apparatus 2 including rack for the elevation of basting pan 6 so that when pan 6 is filled with basting liquid, the food being cooked will continuously be engaged with the surface of the basting liquid. Furthermore, basting pan 6 as shown is dimensioned to contain a quantity of basting fluid and is placed on top of grid 8. Depending on the size of basting pan 6, rack 4 can be adjusted to optimize pan's 6 proximity to the food by moving interior and exterior members 20 and 22 of grid 8 and interior and exterior members 30 and 32 of support frame 10.

Figure 2:
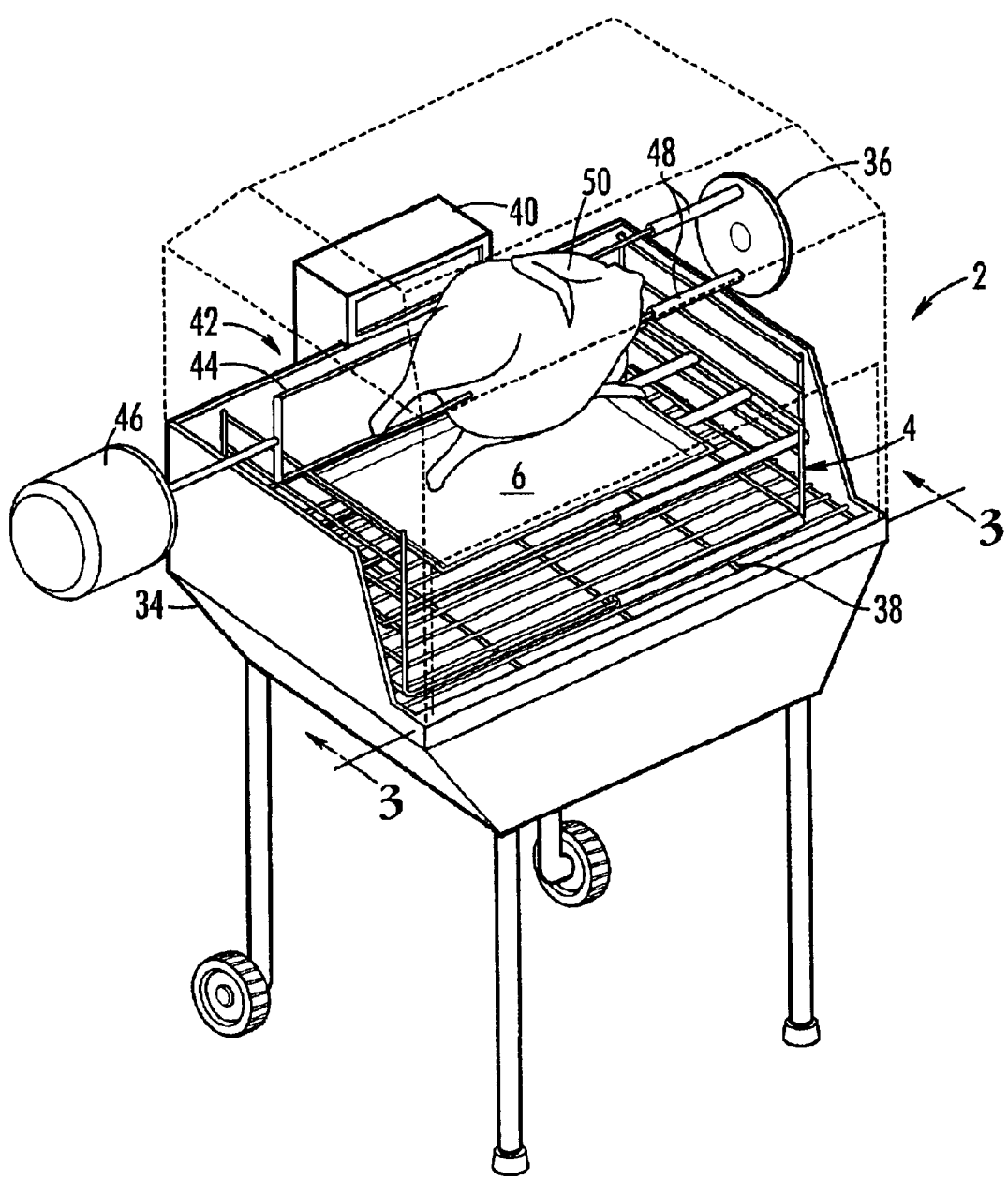
FIG. 2 is a perspective view of the basting apparatus mounted in a gas-powered grill.

Referring particularly to FIG. 2, the preferred embodiment of the invention is shown generally at numeral 2. The basting apparatus 2 includes a grill 34, a rotisserie 36, rack 4, and basting pan 6. As shown, grill 34 has a surface 38 on which it carries rack 4 and pan 6. Although grill can be powered by a variety of methods such as by heat radiants or gas, the preferred embodiment shows gas-powered grill. Heating element 40 for grill 34 is located on rear wall 42 of grill 8. This feature is important because it prevents the smoke and flames that potentially result when drippings from the food being prepared fall directly on top of heating element 40.

As shown, rack 4 and pan 6 are carried on surface 38 of grill 34. As previously discussed, rack 4 is adjustable to fit a variety of different sized grills. Basting apparatus 2 further includes a rotisserie 36 in spaced relation to heating element 40 and rack 4. Rotisserie 36 shown has means for rotating 46 such as a motor, a spit 44 adapted for rotation, and support brackets 48 for spit 44. According to the preferred embodiment, rack 4 is dimensioned to fit between spit 44 and surface of grill 34.

To prepare food by this method, food product 50 is first threaded onto spit 44. Typically, the type of food used is meat, such as chicken or turkey. The next step is to mount spit 44 onto support brackets 48. Rack 4 that supports basting pan 6 is then placed on surface 38 of grill 34. As illustrated, basting pan 6 is dimensioned to contain basting fluid. Depending on the space between pan 6 and food 50 suspended by spit 44, rack 4 is adjusted so that food 50 will continuously be in engagement with surface of basting fluid contained by pan 6. Once all these adjustments have been made, means for rotating 46 is initiated in conjunction with grill's 34 heating element 40. Heating element is located on rear wall 42 of grill 34 in spaced relation to spit 44. Therefore, if basting fluid is inadvertently spilled during the cooking, the location of heating element 40 will also prevent any smoke that may result. As food 50 is rotated and heated, it is continuously basted. The final result is an evenly cooked, juicy, and flavored food product 50.

It will be apparent to those skilled in the art of rotisserie cooking that many substitutions and modifications made be made to the foregoing preferred embodiments without departing from the spirit and scope of the present invention, which is defined by the appended claims.

What is claimed is:

1. A basting apparatus, comprising:
    a rack wherein said rack includes a frame, said frame carrying a set of rungs, and wherein said rack includes a grid, said grid fitting between said rungs; and
    a pan supported by said rack.

2. The basting apparatus as recited in claim 1, wherein said grid has plural exterior bars and plural interior bars, said plural exterior bars fitting telescopically over said plural interior bars.

3. The basting apparatus as recited in claim 2, wherein said plural exterior bars are parallel and said plural interior bars are parallel.

4. The basting apparatus as recited in claim 1, wherein said pan is supported by said grid.

5. The basting apparatus as recited in claim 1, wherein said rack has base members and elevates said pan above said base members.

6. The basting apparatus as recited in claim 1, wherein said rack has base members, said rungs being supported at an angle with respect to said base members.

7. The basting apparatus as recited in claim 1, wherein said rack is adjustable.

8. The basting apparatus as recited in claim 1, wherein said rack is telescopically adjustable.

9. A basting apparatus, comprising:
    a rack, wherein said rack includes a frame having plural rungs; and
    a grid supported by said rungs;
    a pan supported by said rack; and
    a grill having a surface and carrying said rack and said pan on said surface.

10. The basting apparatus as recited in claim 9, wherein said rack is adjustable.

11. The basting apparatus as recited in claim 9, wherein said grill comprises:
    a spit;
    means for rotating said spit; and
    a heating element in spaced relation to said spit.

12. The basting apparatus as recited in claim 11, wherein said rack is dimensioned to fit between said spit and said surface of said grill.

13. A basting apparatus, comprising:
    a rack, wherein said rack includes a frame having plural rungs and
    a grid supported by said rungs;
    a pan supported by said rack; and
    a grill having a surface and carrying said rack and said pan on said surface, wherein said grill includes a spit, means for rotating said spit, and a heating element in spaced relation to said spit, and wherein said pan is dimensioned so that, when filled with basting fluid and a food product is on said spit, said basting fluid will be in contact with said food product.

* * * * *